an image capturing device main body, a first detection unit that
detects a shake amount of the imaging lens, a second
detection unit that detects a shake amount of the image
capturing device main body, a first driving unit that performs
image shake correction by a correction lens based on a
detection result of the first detection unit, a second driving
unit that performs image shake correction by the image
capturing device main body based on a detection result of
the second detection unit, a finder that is used for observing
an optical image transmitting through the imaging lens, a
reception device that receives an image capturing instruction
of the optical image, and a CPU and a CPU that perform, in
an optical view mode in which the optical image is observed
by the finder, a control of causing each of the first detection
unit and the second detection unit to detect the shake amount
and causing only the first driving unit to perform image

United States Patent
Tanaka

(10) Patent No.: US 11,431,905 B2
(45) Date of Patent: Aug. 30, 2022

(54) IMAGE CAPTURING DEVICE, IMAGE CAPTURING METHOD, AND PROGRAM

(71) Applicant: FUJIFILM Corporation, Tokyo (JP)

(72) Inventor: Koichi Tanaka, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 105 days.

(21) Appl. No.: 17/133,719

(22) Filed: Dec. 24, 2020

(65) Prior Publication Data

US 2021/0120162 A1 Apr. 22, 2021

Related U.S. Application Data

(63) Continuation of application No. PCT/JP2019/028848, filed on Jul. 23, 2019.

(30) Foreign Application Priority Data

Aug. 31, 2018 (JP) .............................. JP2018-163901

(51) Int. Cl.
H04N 5/232 (2006.01)

(52) U.S. Cl.
CPC ....... *H04N 5/2327* (2013.01); *H04N 5/23254* (2013.01); *H04N 5/23287* (2013.01)

(58) Field of Classification Search
CPC ............. H04N 5/2327; H04N 5/23254; H04N 5/23287; H04N 5/232; H04N 5/23245; G03B 5/00; G03B 13/02; G03B 17/18
See application file for complete search history.

(56) References Cited

U.S. PATENT DOCUMENTS

| 9,661,224 | B2* | 5/2017 | Takeuchi | ........... H04N 5/23287 |
| 2009/0160956 | A1* | 6/2009 | Yumiki | .............. H04N 5/23258 348/208.11 |

(Continued)

FOREIGN PATENT DOCUMENTS

| JP | H11-101998 A | 4/1999 |
| JP | 2009-265182 A | 11/2009 |

(Continued)

OTHER PUBLICATIONS

International Search Report issued in PCT/JP2019/028848; dated Oct. 8, 2019.

(Continued)

*Primary Examiner* — Gevell V Selby
(74) *Attorney, Agent, or Firm* — Studebaker & Brackett PC

(57) ABSTRACT

An image capturing device includes an imaging lens, an image capturing device main body, a first detection unit that detects a shake amount of the imaging lens, a second detection unit that detects a shake amount of the image capturing device main body, a first driving unit that performs image shake correction by a correction lens based on a detection result of the first detection unit, a second driving unit that performs image shake correction by the image capturing device main body based on a detection result of the second detection unit, a finder that is used for observing an optical image transmitting through the imaging lens, a reception device that receives an image capturing instruction of the optical image, and a CPU and a CPU that perform, in an optical view mode in which the optical image is observed by the finder, a control of causing each of the first detection unit and the second detection unit to detect the shake amount and causing only the first driving unit to perform image (Continued)

shake correction except for a case where the image capturing instruction is being received.

20 Claims, 9 Drawing Sheets

(56) References Cited

U.S. PATENT DOCUMENTS

| | | | |
|---|---|---|---|
| 2015/0281581 A1 | 10/2015 | Sakurai et al. | |
| 2017/0019600 A1 | 1/2017 | Koyano | |
| 2018/0103205 A1 | 4/2018 | Kikuchi et al. | |
| 2019/0230288 A1* | 7/2019 | Tsuchiya | H04N 5/2254 |
| 2021/0120162 A1 | 4/2021 | Tanaka | |

FOREIGN PATENT DOCUMENTS

| | | |
|---|---|---|
| JP | 2015-194711 A | 11/2015 |
| JP | 2017-021253 A | 1/2017 |
| JP | 2018-060160 A | 4/2018 |
| WO | 2020/044881 A1 | 3/2020 |

OTHER PUBLICATIONS

International Preliminary Report on Patentability issued in PCT/JP2019/028848; completed Oct. 2, 2020.

An Office Action; "Notice of Reasons for Refusal," mailed by the Japanese Patent Office dated Mar. 22, 2022, which corresponds to Japanese Patent Application No. 2021-096875 and is related to U.S. Appl. No. 17/133,719 with English language translation.

* cited by examiner

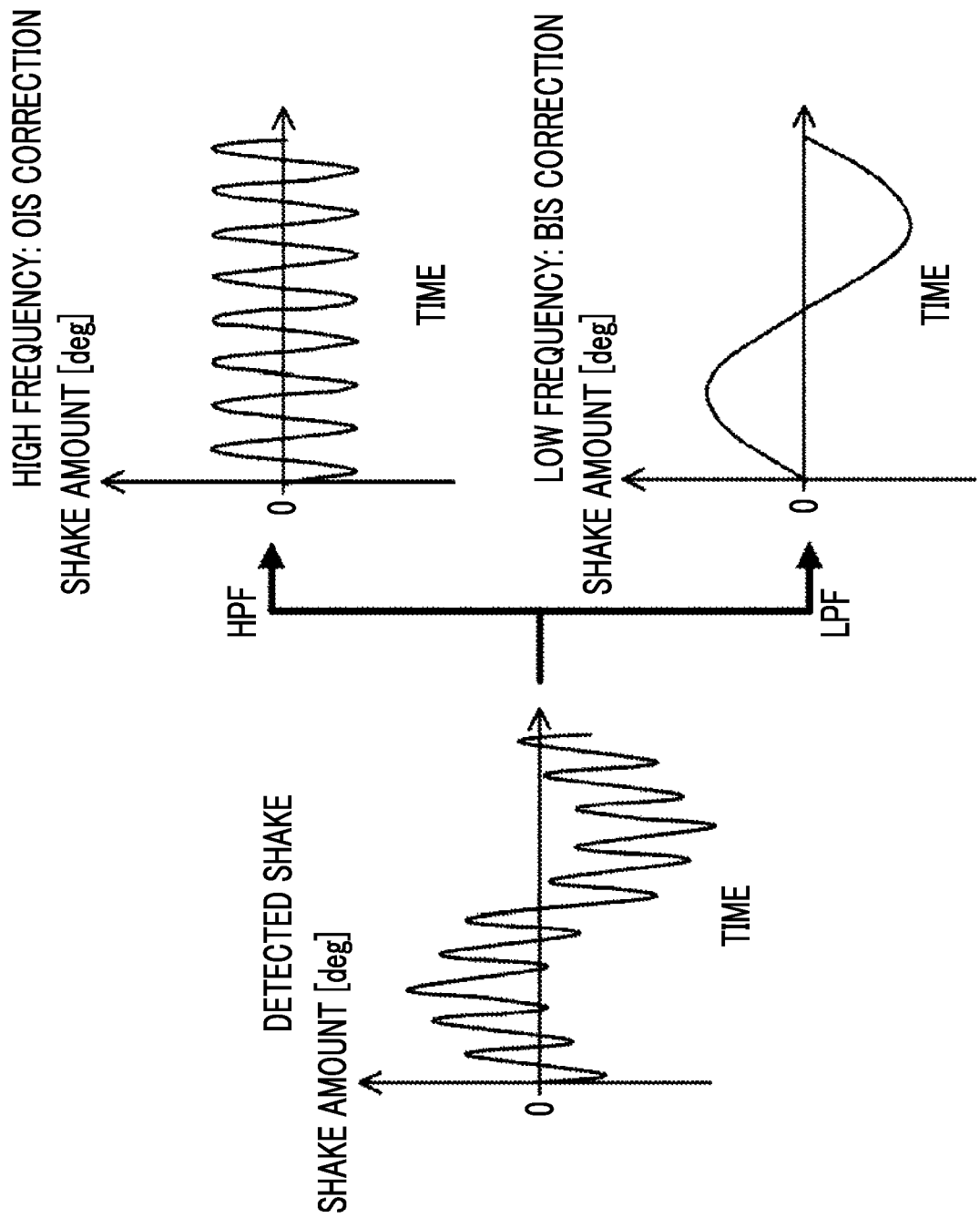

IMAGE CAPTURING DEVICE, IMAGE CAPTURING METHOD, AND PROGRAM

CROSS-REFERENCE TO RELATED APPLICATIONS

This application is a Continuation of PCT International Application No. PCT/JP2019/028848 filed on Jul. 23, 2019, which claims priority under 35 U.S.C. § 119(a) to Japanese Patent Application No. 2018-163901 filed on Aug. 31, 2018. Each of the above application(s) is hereby expressly incorporated by reference, in its entirety, into the present application.

BACKGROUND OF THE INVENTION

1. Field of the Invention

The present disclosure relates to an image capturing device, an image capturing method, and a non-transitory computer readable medium for storing a program.

2. Description of the Related Art

In related art, for camera shake correction, there is known an image capturing device having a shake correction function in both of an imaging lens and an image capturing device main body, and there is known an image capturing device that performs image shake correction by cooperation of a shake correction function of the imaging lens and a shake correction function of the image capturing device main body. As a technique related to such an image capturing device, there is known an image capturing device that performs image shake correction by using a combination of correction by one of the shake correction function of the imaging lens and the shake correction function of the image capturing device main body and correction by cooperation of both of the shake correction functions.

For example, JP2009-265182A discloses an image capturing device that performs correction by using the shake correction function of the imaging lens until an exposure start instruction is input and performs image shake correction by cooperation of the shake correction function of the imaging lens and the shake correction function of the image capturing device main body in a case where an exposure start instruction is input. Further, for example, JP2015-194711A discloses an image capturing device that performs correction of high-frequency components of a shake amount of an image shake by the shake correction function of the imaging lens before a release button is pressed and performs image shake correction by cooperation processing of correcting the high-frequency components by the shake correction function of the imaging lens and correcting low-frequency components by the shake correction function of the image capturing device main body after the release button is pressed.

SUMMARY OF THE INVENTION

However, in the technique in which image shake correction is performed by a combination of correction by one of the shake correction function of the imaging lens and the shake correction function of the image capturing device main body and correction by cooperation of both of the shake correction functions, there is a case where a shake cannot be accurately corrected. For example, in a case where correction by any one of the shake correction functions is switched to correction by the other of the shake correction functions in a cooperation relationship, the other shake correction function, which is not used until the switching, is started to operate, and as a result, there is a case where a shake cannot be accurately corrected.

The present disclosure has been made in consideration of the above circumstances, and an object of the present disclosure is to provide an image capturing device, an image capturing method, and a non-transitory computer readable medium for storing a program capable of accurately correcting a shake.

In order to achieve the above object, according to a first aspect of the present disclosure, there is provided an image capturing device including: an imaging lens; an image capturing device main body including an imaging element that captures an optical image transmitting through the imaging lens; a first detection unit that detects a shake amount of the imaging lens; a second detection unit that detects a shake amount of the image capturing device main body; a first correction unit that performs image shake correction by a correction lens based on a detection result of the first detection unit; a second correction unit that performs image shake correction by the image capturing device main body based on a detection result of the second detection unit; an observation unit that is used for observing the optical image transmitting through the imaging lens; a reception unit that receives an image capturing instruction of the optical image; and a control unit that performs, in an observation mode in which the optical image is observed by the observation unit, a control of causing each of the first detection unit and the second detection unit to detect the shake amount and causing only the first correction unit to perform image shake correction except for a case where the image capturing instruction is being received.

Further, according to a second aspect of the present disclosure, in the image capturing device according to the first aspect, in the observation mode, in a case where the image capturing instruction is being received, the control unit performs a control of causing each of the first detection unit and the second detection unit to detect the shake amount and causing each of the first correction unit and the second correction unit to perform image shake correction.

Further, according to a third aspect of the present disclosure, the image capturing device according to the first aspect or the second aspect further includes a display unit that displays a captured image according to an image signal obtained by capturing by the imaging element. In a display mode in which the captured image is displayed by the display unit, regardless of whether or not the image capturing instruction is being received, the control unit performs a control of causing each of the first detection unit and the second detection unit to detect the shake amount and causing each of the first correction unit and the second correction unit to perform image shake correction.

Further, according to a fourth aspect of the present disclosure, in the image capturing device according to the second aspect or the third aspect, in a case where the control unit causes each of the first correction unit and the second correction unit to perform image shake correction, the control unit performs a control of causing each of the first correction unit and the second correction unit to share the shake amount and perform image shake correction.

Further, according to a fifth aspect of the present disclosure, in the image capturing device according to the third aspect, a correction amount with which the control unit causes the second correction unit to perform image shake correction in the observation mode is larger than a correction amount with which the control unit causes the second correction unit to perform image shake correction in the display mode.

Further, according to a sixth aspect of the present disclosure, in the image capturing device according to the second aspect or the third aspect, in a case where the control unit causes each of the first correction unit and the second correction unit to perform image shake correction, the control unit causes the second correction unit to correct low frequency components of the image shake having a frequency lower than a predetermined frequency, and causes the first correction unit to correct high frequency components of the image shake having a frequency equal to or higher than the predetermined frequency.

Further, according to a seventh aspect of the present disclosure, in the image capturing device according to any one of the first aspect to the sixth aspect, the second detection unit includes a plurality of pieces of processing for detecting the shake amount of the image capturing device main body, and the control unit performs, in the observation mode, a control of causing the second detection unit to perform a part of the plurality of pieces of processing except for a case where the image capturing instruction is being received, and causing the second detection unit to perform the rest of the plurality of pieces of processing in a case where the image capturing instruction is received.

Further, according to an eighth aspect of the present disclosure, in the image capturing device according to the seventh aspect, the second detection unit includes a sensor that outputs a signal indicating a detection result obtained by detecting an angular velocity, the part of the plurality of pieces of processing is processing of removing an external factor included in the signal, and the rest of the plurality of pieces of processing is processing of calculating the shake amount based on the signal from which the external factor is removed.

Further, according to a ninth aspect of the present disclosure, in the image capturing device according to any one of the first aspect to the sixth aspect, the first correction unit performs image shake correction by moving the correction lens, the second correction unit performs image shake correction by moving the imaging element, and the control unit performs, in the observation mode, a control of moving the imaging element according to a correction amount except for a case where the image capturing instruction is being received, the correction amount being smaller than a correction amount with which the second correction unit performs image shake correction in a case where the image capturing instruction is being received.

Further, according to a tenth aspect of the present disclosure, in the image capturing device according to any one of the first aspect to the ninth aspect, the control unit calculates a correction amount with which the first correction unit performs correction based on the detection result of the first detection unit, and calculates a correction amount with which the second correction unit performs correction based on the detection result of the second detection unit.

Further, according to an eleventh aspect of the present disclosure, in the image capturing device according to any one of the first aspect to the ninth aspect, the control unit includes a first control unit that controls the first detection unit according to a detection instruction signal and controls the first correction unit according to a correction instruction signal, and a second control unit that outputs the detection instruction signal and the correction instruction signal to the first control unit and controls the second detection unit and the second correction unit.

Further, according to a twelfth aspect of the present disclosure, in the image capturing device according to the eleventh aspect, the first control unit calculates a correction amount with which the first correction unit performs correction based on the detection result of the first detection unit, and the second control unit calculates a correction amount with which the second correction unit performs correction based on the detection result of the second detection unit.

Further, according to a thirteenth aspect of the present disclosure, in the image capturing device according to the eleventh aspect or the twelfth aspect, the first control unit, the imaging lens, the first detection unit, and the first correction unit are included in a lens unit, and the second control unit, the imaging element, the second detection unit, and the second correction unit are included in the image capturing device main body.

On the other hand, in order to achieve the above object, according to a fourteenth aspect of the present disclosure, there is provided an image capturing method performed by an image capturing device including an imaging lens, an image capturing device main body including an imaging element that captures an optical image transmitting through the imaging lens, a first detection unit that detects a shake amount of the imaging lens, a second detection unit that detects a shake amount of the image capturing device main body, a first correction unit that performs image shake correction by a correction lens based on a detection result of the first detection unit, a second correction unit that performs image shake correction by the image capturing device main body based on a detection result of the second detection unit, an observation unit that is used for observing the optical image transmitting through the imaging lens, and a reception unit that receives an image capturing instruction of the optical image, the method including: performing, in an observation mode in which the optical image is observed by the observation unit, a control of causing each of the first detection unit and the second detection unit to detect the shake amount and causing only the first correction unit to perform image shake correction except for a case where the image capturing instruction is being received.

Further, in order to achieve the above object, according to a fifteenth aspect of the present disclosure, there is provided a non-transitory computer readable medium for storing a program for causing a computer controlling an image capturing device to execute a process, the image capturing device including an imaging lens, an image capturing device main body including an imaging element that captures an optical image transmitting through the imaging lens, a first detection unit that detects a shake amount of the imaging lens, a second detection unit that detects a shake amount of the image capturing device main body, a first correction unit that performs image shake correction by a correction lens based on a detection result of the first detection unit, a second correction unit that performs image shake correction by the image capturing device main body based on a detection result of the second detection unit, an observation unit that is used for observing the optical image transmitting through the imaging lens, and a reception unit that receives an image capturing instruction of the optical image, the process including: performing, in an observation mode in which the optical image is observed by the observation unit, a control of causing each of the first detection unit and the second detection unit to detect the shake amount and causing only the first correction unit to perform image shake correction except for a case where the image capturing instruction is being received.

Further, according to the present disclosure, there is provided an image capturing device including: an imaging lens; an image capturing device main body including an imaging element that captures an optical image transmitting through the imaging lens; a first detection unit that detects a shake amount of the imaging lens; a second detection unit that detects a shake amount of the image capturing device main body; a first correction unit that performs image shake correction by a correction lens based on a detection result of the first detection unit; a second correction unit that performs image shake correction by the image capturing device main body based on a detection result of the second detection unit; an observation unit that is used for observing the optical image transmitting through the imaging lens; a reception unit that receives an image capturing instruction of the optical image; a memory that stores a command for causing a computer controlling the image capturing device to execute a process; and a processor configured to execute the stored command. The processor performs, in an observation mode in which the optical image is observed by the observation unit, a control of causing each of the first detection unit and the second detection unit to detect the shake amount and causing only the first correction unit to perform image shake correction except for a case where the image capturing instruction is being received.

According to the present disclosure, it is possible to accurately correct a shake.

BRIEF DESCRIPTION OF THE DRAWINGS

FIG. 11 is a diagram for explaining a modification example of cooperation processing according to the embodiment.

DESCRIPTION OF THE PREFERRED EMBODIMENTS

First Embodiment

Hereinafter, an example of an embodiment for performing a technique according to the present disclosure will be described in detail with reference to the drawings. In the following, shake correction by an imaging lens is referred to as optical image stabilizer (OIS), and shake correction by an image capturing device main body is referred to as body image stabilizer (BIS).

First, before details of the embodiment will be described, cooperation processing of performing image shake correction by cooperation of both of OIS and BIS will be described.

In a case of performing correction by OIS, correction is performed by moving a correction lens 73 (refer to FIG. 4) included in an imaging lens 14 (refer to FIGS. 3 and 4) to be described. On the other hand, there is a limit in a movable range of the correction lens 73. Depending on the movable range of the correction lens 73, there is also a limit in a correction range in which correction can be performed by OIS, and thus a maximum value of a correction amount is predetermined. Further, in a case of performing correction by BIS, correction is performed by moving an imaging element 22 (refer to FIG. 3) to be described. On the other hand, there is a limit in a movable range of the imaging element 22. Depending on the movable range of the imaging element 22, there is also a limit in a correction range in which correction can be performed by BIS, and thus a maximum value of a correction amount is predetermined.

Figure 1:
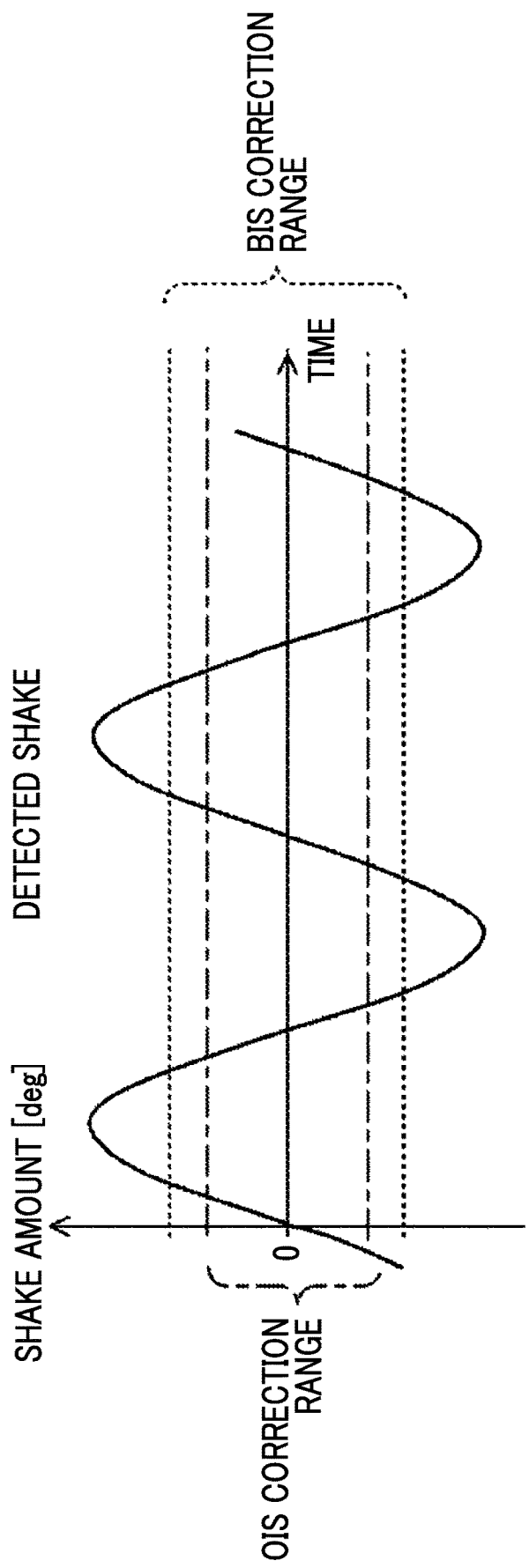
FIG. 1 is a diagram for explaining a problem in a case where shake correction is performed by any one of OIS and BIS.

As illustrated in FIG. 1, in a case where a detected shake is a relatively-large shake which exceeds both of the OIS correction range and the BIS correction range, the shake cannot be completely corrected by correction using only OIS, and as a result, the shake may remain. Further, in this case, the shake cannot be completely corrected by correction using only BIS, and as a result, the shake may remain.

Although details will be described later, as in an image capturing device according to the present embodiment, in a case of an image capturing device including a through-the-lens (TTL) type optical finder, in an optical view mode to be described, in a state where subject light is guided to the optical finder, an optical image can be corrected only by OIS. In other words, the image shake of the optical image observed by the optical finder can be corrected only by OIS.

Figure 2:
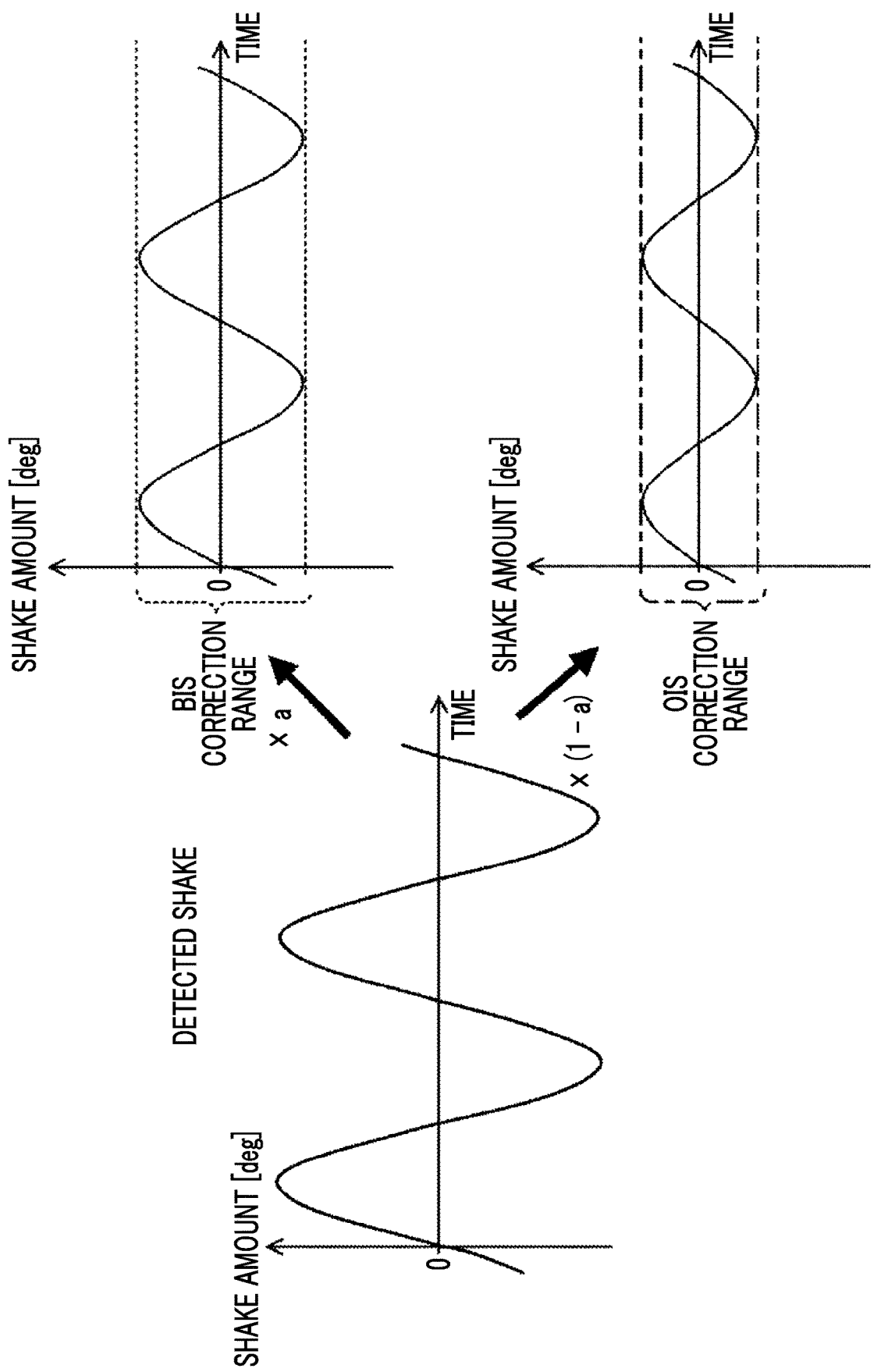
FIG. 2 is a conceptual diagram of processing of performing shake correction by cooperation of both of OIS and BIS.

On the other hand, in a live view mode to be described and even in the optical view mode, in a case of correction of an optical image captured by the imaging element 22 (refer to FIG. 3), the correction can be performed by either of BIS or OIS. Thus, in this case, by performing the correction by cooperation of both of BIS and OIS, it is possible to deal with an image shake having a relatively-large shake amount that exceeds the correction range by BIS and the correction range by OIS. For example, as illustrated in FIG. 2 as an example, in a state where a<1 is set and a share ratio of a:(1−a) is set, by performing correction by cooperation of BIS and OIS, it is possible to dealt with an image shake having a relatively-large shake amount.

Therefore, in the present embodiment, in the optical view mode, correction is performed only by OIS except for a case where an image capturing instruction is being received, and image shake correction is performed by cooperation of both of BIS and OIS in a case where an image capturing instruction is being received.

Figure 3:
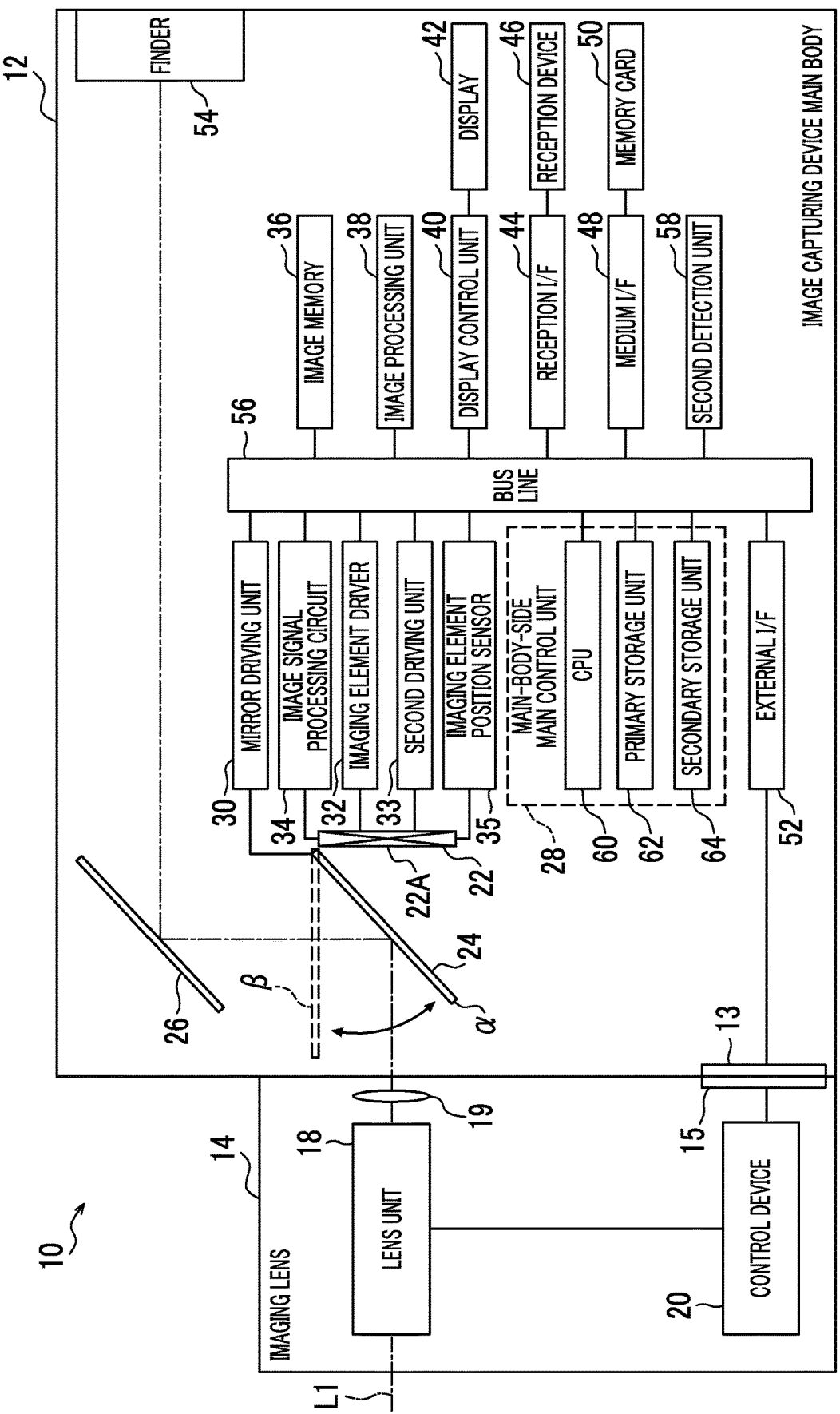
FIG. 3 is a block diagram illustrating an example of a hardware configuration of an image capturing device according to an embodiment.

Next, a configuration of an image capturing device 10 according to the present embodiment will be described with reference to FIGS. 3 and 4. As illustrated in FIG. 3, the image capturing device 10 is a lens interchangeable type digital camera, and includes an image capturing device main body 12 and an imaging lens 14. The imaging lens 14 is interchangeably attached to the image capturing device main body 12.

The image capturing device 10 according to the present embodiment has a still image capturing mode and a moving image capturing mode as operation modes of an image capturing system. The still image capturing mode is an operation mode for recording a still image obtained by capturing an image of a subject, and the moving image capturing mode is an operation mode for recording a moving image obtained by capturing an image of a subject.

In the image capturing device 10, the still image capturing mode and the moving image capturing mode are selectively set according to an instruction which is input to the image capturing device 10 by a user. In the still image capturing mode, a manual focus mode and an auto focus mode are selectively set according to an instruction which is input to the image capturing device 10 by a user. In the following, auto focus is referred to as "auto focus (AF)".

In the AF mode, an image capturing condition is adjusted by half pressing a release button (not illustrated) provided in the image capturing device main body 12, and then main exposure is performed in a case where the release button is continuously and fully pressed. In other words, in a case where the release button is half pressed, an auto exposure (AE) function is enabled and an exposure state is set. Then, an AF function is enabled and a focus control is performed. In this state, in a case where the release button is fully pressed, image capturing is performed.

The image capturing device main body 12 includes a mount 13, and the imaging lens 14 includes a mount 15. The mount 15 is coupled to the mount 13, and thus the imaging lens 14 is interchangeably attached to the image capturing device main body 12. The imaging lens 14 includes a lens unit 18, a diaphragm 19, and a control device 20. The diaphragm 19 is provided closer to the image capturing device main body 12 than the lens unit 18, adjusts a light amount of subject light transmitting through the lens unit 18, and guides the subject light into the image capturing device main body 12. The control device 20 is electrically connected to the image capturing device main body 12 via the mounts 13 and 15, and controls the entire imaging lens 14 according to an instruction from the image capturing device main body 12.

The image capturing device main body 12 includes an imaging element 22, a first mirror 24, a second mirror 26, a main-body-side main control unit 28, a mirror driving unit 30, an imaging element driver 32, an image signal processing circuit 34, an image memory 36, an image processing unit 38, a display control unit 40, and a display 42. The image capturing device main body 12 further includes a reception interface (I/F) 44, a reception device 46, a medium I/F 48, a memory card 50, an external I/F 52, and a finder 54. The image capturing device main body 12 further includes a second driving unit 33, an imaging element position sensor 35, and a second detection unit 58.

The imaging element 22 according to the present embodiment is an example of an imaging element that captures an optical image transmitting through the imaging lens 14. In the present embodiment, an image which is captured by the imaging element 22, such as a still image, a moving image, or a live view image, is collectively referred to as a "captured image".

The main-body-side main control unit 28 is an example of a computer controlling the image capturing device 10, and includes a central processing unit (CPU) 60, a primary storage unit 62, and a secondary storage unit 64.

The CPU 60 controls the entire image capturing device 10. The primary storage unit 62 is a volatile memory used as a work area or the like in execution of various programs. As an example of the primary storage unit 62, a random access memory (RAM) may be used. The secondary storage unit 64 is a non-volatile memory that stores various programs and various parameters in advance. As an example of the secondary storage unit 64, a flash memory may be used.

The CPU 60, the primary storage unit 62, and the secondary storage unit 64 are connected to a bus line 56. Further, the mirror driving unit 30, the imaging element driver 32, the image signal processing circuit 34, the image memory 36, the image processing unit 38, the display control unit 40, the reception I/F 44, the medium I/F 48, and the external I/F 52 are also connected to the bus line 56. Further, the second driving unit 33, the imaging element position sensor 35, and the second detection unit 58 are also connected to the bus line 56.

The first mirror 24 is a movable mirror that is interposed between a light receiving surface 22A of the imaging element 22 and the lens unit 18 and is movable between a light-receiving-surface covering position $\alpha$ and a light-receiving-surface open position $\beta$. The first mirror 24 is connected to the mirror driving unit 30, and the mirror driving unit 30 selectively disposes the first mirror 24 at the light-receiving-surface covering position $\alpha$ and the light-receiving-surface open position $\beta$ by driving the first mirror 24 under a control of the CPU 60. That is, the first mirror 24 is disposed at the light-receiving-surface covering position $\alpha$ by the mirror driving unit 30 in a case where subject light is not received to the light receiving surface 22A, and the first mirror 24 is disposed at the light-receiving-surface open position $\beta$ by the mirror driving unit 30 in a case where subject light is received to the light receiving surface 22A.

At the light-receiving-surface covering position $\alpha$, the first mirror 24 covers the light receiving surface 22A, and reflects subject light guided from the lens unit 18 and guides the reflected subject light to the second mirror 26. The second mirror 26 reflects the subject light guided from the first mirror 24, and guides the reflected subject light to the finder 54 via an optical system (not illustrated). The finder 54 transmits the subject light guided by the second mirror 26. By transmitting the subject light in this manner, the finder 54 according to the present embodiment is used for allowing a user to observe the optical image transmitting through the imaging lens 14. The finder 54 according to the present embodiment is an example of an observation unit according to the present disclosure. In the present embodiment, a mode in which the user observes the optical image of the subject by using the finder 54 is referred to as an "optical view mode". The optical view mode according to the present embodiment is an example of an observation mode according to the present disclosure.

Although details will be described later, in the image capturing device 10 according to the present embodiment, as an example, in the optical view mode, the first mirror 24 is disposed at the light-receiving-surface covering position $\alpha$ except for a case where an image capturing instruction is being received.

On the other hand, in the image capturing device 10, in the optical view mode, the first mirror 24 is disposed at the light-receiving-surface open position $\beta$ while an image capturing instruction is being received. Further, in the image capturing device 10, in the live view mode to be described, the first mirror 24 is disposed at the light-receiving-surface open position $\beta$ both in a case where an image capturing instruction is being received and in a case where an image capturing instruction is not being received.

At the light-receiving-surface open position $\beta$, a state where the light receiving surface 22A is covered by the first mirror 24 is released, and the subject light is received by the light receiving surface 22A without being reflected by the first mirror 24, and reaches the imaging element 22.

The imaging element driver 32 is connected to the imaging element 22, and supplies a driving pulse to the imaging element 22 under a control of the CPU 60. Each pixel of the imaging element 22 is driven according to the driving pulse supplied by the imaging element driver 32. In the present embodiment, as the imaging element 22, a charge coupled device (CCD) image sensor is used. On the other hand, the technique according to the present disclosure is not limited thereto, and for example, other image sensors such as a complementary metal oxide semiconductor (CMOS) image sensor may be used.

The image signal processing circuit 34 reads an image signal for one frame from the imaging element 22 for each pixel under a control of the CPU 60. The image signal processing circuit 34 performs, on the read image signal, various processing such as sampling two correlation pile processing, automatic gain adjustment, and A/D conversion. The image signal processing circuit 34 outputs, a digital image signal obtained by performing various processing on the image signal, to the image memory 36, for each frame at a predetermined frame rate (for example, several tens of frames/seconds) defined by a clock signal supplied from the CPU 60. The image memory 36 temporarily holds the image signal which is input from the image signal processing circuit 34.

The image processing unit 38 acquires the image signal from the image memory 36 for each frame at a predetermined frame rate, and performs, on the acquired image signal, various processing such as gamma correction, brightness and chroma conversion, and compression processing. Further, the image processing unit 38 outputs, to the display control unit 40, the image signal obtained by performing various processing for each frame at a predetermined frame rate. Further, the image processing unit 38 outputs, to the CPU 60, the image signal obtained by performing various processing, according to a request from the CPU 60.

The display control unit 40 is connected to the display 42, and controls the display 42 under a control of the CPU 60. Further, the display control unit 40 outputs, to the display 42, the image signal which is input from the image processing unit 38 for each frame at a predetermined frame rate. The display 42 displays, as a live view image, an image represented by the image signal which is input from the display control unit 40 at a predetermined frame rate. The display 42 also displays a still image that is a single frame image obtained by capturing an image in a single frame. In addition to the live view image, the display 42 also displays a menu screen and the like.

In this way, the display 42 according to the present embodiment displays the captured image according to the image signal obtained by capturing by the imaging element 22. The display 42 according to the present embodiment is an example of a display unit according to the present disclosure. In the present embodiment, a mode in which the user observes the live view image on the display 42 is referred to as a "live view mode". The live view mode according to the present embodiment is an example of a display mode according to the present disclosure.

The reception device 46 includes a dial, a release button, a cross key, a menu key, a touch panel, and the like, which are not illustrated, and receives various instructions from the user that include setting of mode between the optical view mode and the live view mode. The reception device 46 is connected to the reception I/F 44, and outputs an instruction content signal indicating contents of a received instruction to the reception I/F 44. The reception I/F 44 outputs, to the CPU 60, the instruction content signal which is input from the reception device 46. The CPU 60 executes processing according to the instruction content signal which is input from the reception I/F 44. The reception device 46 according to the present embodiment is an example of the reception unit according to the present disclosure.

The medium I/F 48 is connected to the memory card 50, and records and reads an image file to and from the memory card 50 under a control of the CPU 60. The image file which is read from the memory card 50 by the medium I/F 48 is decompressed by the image processing unit 38 under a control of the CPU 60, and is displayed on the display 42 as a reproduction image.

As the mount 15 is connected to the mount 13, the external I/F 52 is connected to the control device 20 of the imaging lens 14, and performs transmission/reception of various information between the CPU 60 and the control device 20.

The second driving unit 33 moves the imaging element 22 under a control of the CPU 60. In the present embodiment, the second driving unit 33 moves the imaging element 22 in a plane perpendicular to an optical axis L1 (for example, in an XY plane in a case where the optical axis L1 is a Z axis). Thereby, the second driving unit 33 performs image shake correction. The second driving unit 33 is an example of a second correction unit that performs image shake correction in the image capturing device main body 12. The image shake correction performed by moving the imaging element 22 by the second driving unit 33 corresponds to BIS described above. The second driving unit 33 is not particularly limited as long as the second driving unit 33 is a member capable of moving the imaging element 22. For example, as the second driving unit 33, a member using a magnet and a hall element may be applied, or an actuator including a stepping motor, an ultrasonic motor, or the like may be applied.

The imaging element position sensor 35 detects a position of the imaging element 22 in the plane perpendicular to the optical axis L1. The position of the imaging element 22 detected by the imaging element position sensor 35 is used in a case where the second driving unit 33 moves the imaging element 22. The imaging element position sensor 35 is not particularly limited as long as the imaging element position sensor 35 is a sensor that can detect the position of the imaging element 22 in the plane perpendicular to the optical axis L1.

For example, as the imaging element position sensor 35, a magnetic sensor may be applied, or an optical sensor may be applied.

The second detection unit 58 is fixedly provided in the image capturing device main body 12, and detects a shake amount of the image capturing device main body 12. A detailed configuration of the second detection unit 58 will be described later.

Figure 4:
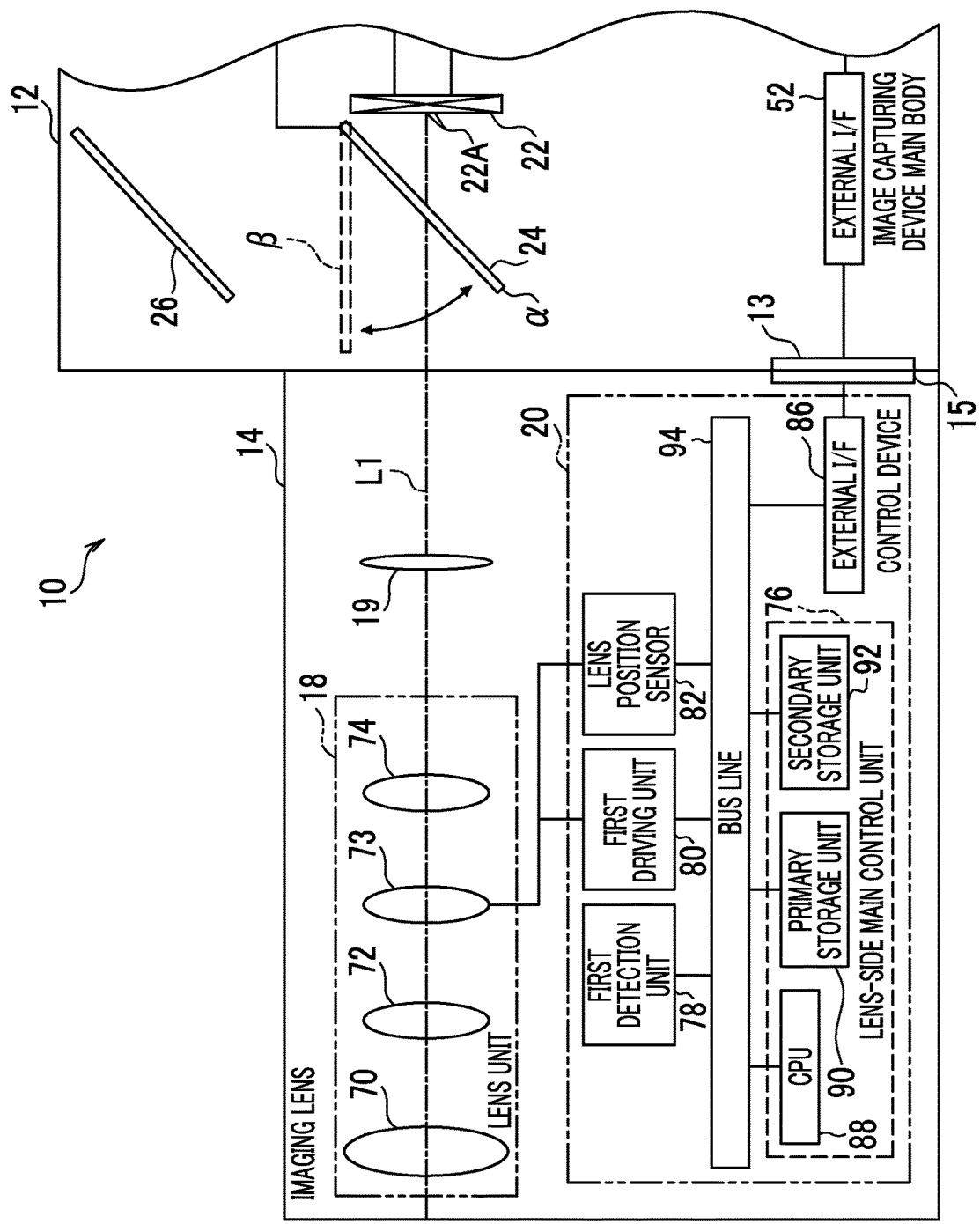
FIG. 4 is a block diagram illustrating an example of a hardware configuration of an imaging lens included in the image capturing device according to the embodiment.

As an example, as illustrated in FIG. 4, the lens unit 18 according to the present embodiment includes a light-incident lens 70, a zoom lens 72, a correction lens 73, and a focus lens 74. The light-incident lens 70, the zoom lens 72, the correction lens 73, and the focus lens 74 are provided along the optical axis L1, and the focus lens 74, the correction lens 73, the zoom lens 72, and the light-incident lens 70 are provided in this order from the diaphragm 19 along the optical axis L1.

The subject light is incident on the light-incident lens 70. The light-incident lens 70 transmits the subject light, and guides the subject light to the zoom lens 72. The zoom lens 72 according to the present embodiment includes a plurality of lenses that can move along the optical axis L1. By adjusting a state of the zoom lens 72, a focal length of the imaging lens 14 (hereinafter, simply referred to as a "focal length") is adjusted. Specifically, in the zoom lens 72, by rotating a zoom ring (not illustrated) provided in the imaging lens 14, the lenses move closer or move away to and from each other along the optical axis L1, and thus a positional relationship between the lenses along the optical axis L1 is adjusted. Therefore, the focal length is adjusted. The zoom lens 72 transmits the subject light which is incident from the light-incident lens 70, and guides the subject light to the correction lens 73.

The correction lens 73 is a lens that can move in the plane perpendicular to the optical axis L1 (for example, in the XY plane in a case where the optical axis L1 is the Z axis), and corrects an image shake by moving in the plane perpendicular to the optical axis L1. The correction lens 73 transmits the subject light which is incident from the zoom lens 72, and guides the subject light to the focus lens 74.

The focus lens 74 is a lens that can move along the optical axis L1, and changes a focus of a subject image formed on the light receiving surface 22A of the imaging element 22 by moving along the optical axis L1. In the following, a position of the focus lens 74 along the optical axis L1 is simply described as a position of the focus lens 74. The focus lens 74 transmits the subject light which is incident from the correction lens 73, and guides the subject light to the diaphragm 19. The diaphragm 19 adjusts a light amount of the subject light which is incident from the focus lens 74, transmits the subject light, and guides the subject light to the image capturing device main body 12.

The control device 20 of the imaging lens 14 includes a lens-side main control unit 76, a first detection unit 78, a first driving unit 80, a lens position sensor 82, and an external I/F 86.

The lens-side main control unit 76 includes a CPU 88, a primary storage unit 90, and a secondary storage unit 92. The CPU 88 controls the entire imaging lens 14. The primary storage unit 90 is a volatile memory used as a work area or the like in execution of various programs. As an example of the primary storage unit 90, a RAM is used. The secondary storage unit 92 is a non-volatile memory that stores various programs and various parameters in advance. As an example of the secondary storage unit 92, a flash memory is used.

The CPU 88, the primary storage unit 90, and the secondary storage unit 92 are connected to a bus line 94. Further, the first detection unit 78, the first driving unit 80, the lens position sensor 82, and the external I/F 86 are connected to the bus line 94.

As the mount 15 is connected to the mount 13, the external I/F 86 is connected to the external I/F 52 of the image capturing device main body 12, and performs transmission and reception of various information between the CPU 88 and the CPU 60 of the image capturing device main body 12 in cooperation with the external I/F 52.

The first detection unit 78 is fixedly provided in the imaging lens 14, and detects a shake amount of the imaging lens 14. A detailed configuration of the first detection unit 78 will be described later.

The first driving unit 80 moves the correction lens 73 under a control of the CPU 88. In the present embodiment, the first driving unit 80 moves the correction lens 73 in the plane perpendicular to the optical axis L1. Thereby, the first driving unit 80 performs image shake correction. The first driving unit 80 is an example of a first correction unit that performs image shake correction in the correction lens 73. The image shake correction performed by moving the correction lens 73 by the first driving unit 80 corresponds to OIS described above. The first driving unit 80 is not particularly limited as long as the first driving unit 80 is a member that can move the correction lens 73. For example, as the first driving unit 80, a member using a magnet and a hall element may be applied, or an actuator including a stepping motor, an ultrasonic motor, or the like may be applied.

The lens position sensor 82 detects a position of the correction lens 73 in the plane perpendicular to the optical axis L1. The position of the correction lens 73 detected by the lens position sensor 82 is used in a case where the correction lens 73 is moved by the first driving unit 80. The lens position sensor 82 is not particularly limited as long as the lens position sensor 82 is a sensor that can detect the position of the correction lens 73 in the plane perpendicular to the optical axis L1. For example, as the lens position sensor 82, a magnetic sensor may be applied, or an optical sensor may be applied.

Figure 5:
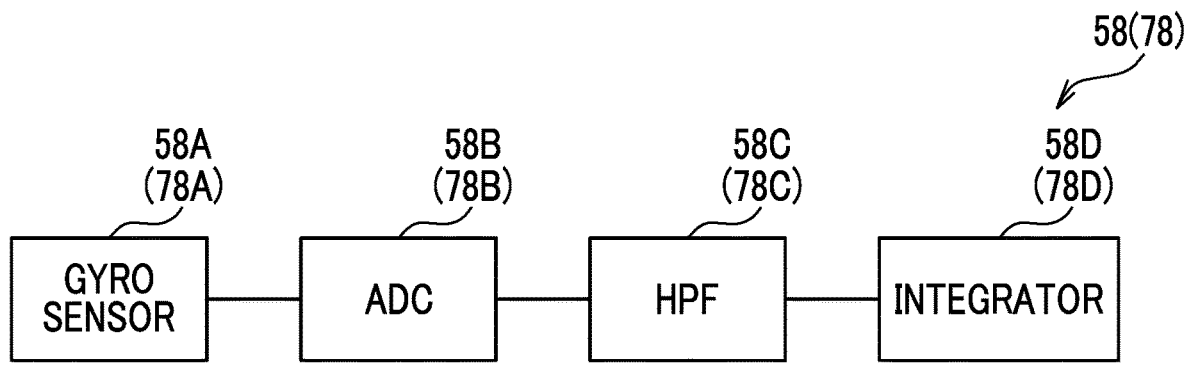
FIG. 5 is a block diagram illustrating an example of a configuration of a first detection unit and a second detection unit according to the embodiment.

Next, configurations of the first detection unit 78 and the second detection unit 58 according to the present embodiment will be described with reference to FIG. 5. As illustrated in FIG. 5, the second detection unit 58 includes a gyro sensor 58A, an analog-to-digital converter (ADC) 58B, a high pass filter (HPF) 58C, and an integrator 58D. The gyro sensor 58A detects an angular velocity [deg/sec] of the image capturing device main body 12, and outputs an analog signal indicating the detected angular velocity to the ADC 58B.

The ADC 58B converts the analog signal indicating the angular velocity which is input from the gyro sensor 58A into a digital signal, and outputs the digital signal indicating the angular velocity obtained by the conversion to the HPF 58C. The HPF 58C is a high pass filter that cuts off components having a frequency lower than a cutoff frequency and outputs components having a frequency equal to or higher than the cutoff frequency to the integrator 58D among components of the digital signal indicating the angular velocity which is input from the ADC 58B.

The integrator 58D outputs a shake amount [deg] of the image capturing device main body 12 by integrating the digital signal which is input from the HPF 58C.

Further, as illustrated in FIG. 5, the first detection unit 78 includes a gyro sensor 78A, an ADC 78B, an HPF 78C, and an integrator 78D. The gyro sensor 78A, the ADC 78B, the HPF 78C, and the integrator 78D are components having the same functions as the gyro sensor 58A, the ADC 58B, the HPF 58C, and the integrator 58D, and thus descriptions thereof will be omitted.

With the above configuration, the first detection unit 78 detects a shake amount of the imaging lens 14, and the second detection unit 58 detects a shake amount of the image capturing device main body 12.

Figure 6:
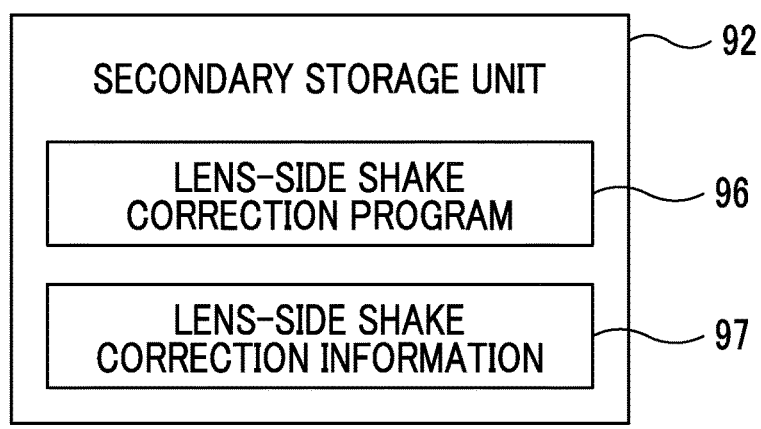
FIG. 6 is a conceptual diagram illustrating an example of storage contents of a secondary storage unit of a lens-side main control unit included in the imaging lens according to the embodiment.

As an example, as illustrated in FIG. 6, the secondary storage unit 92 of the lens-side main control unit 76 stores a lens-side shake correction program 96. The CPU 88 reads the lens-side shake correction program 96 from the secondary storage unit 92, develops the lens-side shake correction program 96 in the primary storage unit 90, and executes shake correction processing by the CPU 88 (refer to FIG. 8) to be described according to the developed lens-side shake correction program 96. In other words, the CPU 88 operates as a first control unit that controls the first driving unit 80 by executing the lens-side shake correction program 96.

The secondary storage unit 92 of the lens-side main control unit 76 also stores lens-side shake correction information 97. The lens-side shake correction information 97 according to the present embodiment includes a maximum value of a correction amount by the first driving unit 80. The maximum value of the correction amount by the first driving unit 80 corresponds to a maximum value of a movement amount of the correction lens 73.

Figure 7:
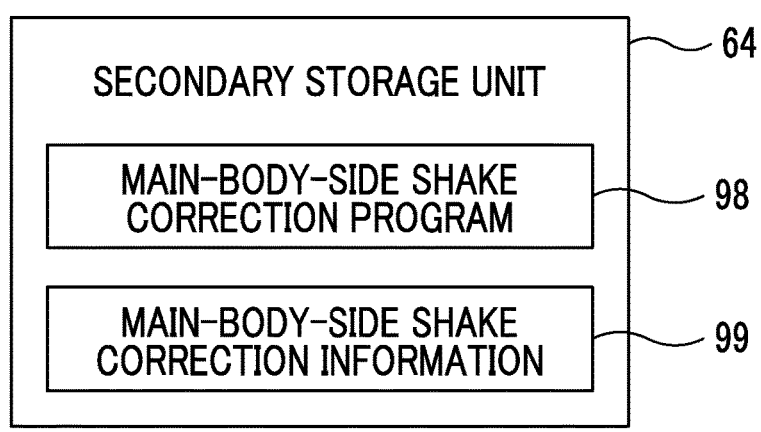
FIG. 7 is a conceptual diagram illustrating an example of storage contents of a secondary storage unit of a main-body-side main control unit included in an image capturing device main body according to the embodiment.

On the other hand, as illustrated in FIG. 7, as an example, the secondary storage unit 64 of the main-body-side main control unit 28 stores a main-body-side shake correction program 98. The CPU 60 reads the main-body-side shake correction program 98 from the secondary storage unit 64, develops the main-body-side shake correction program 98 in the primary storage unit 62, and executes shake correction processing (refer to FIG. 8) to be described according to the developed main-body-side shake correction program 98. In other words, the CPU 60 operates as a second control unit that controls the second driving unit 33 by executing the main-body-side shake correction program 98.

The secondary storage unit 64 of the main-body-side main control unit 28 also stores main-body-side shake correction information 99. The main-body-side shake correction information 99 according to the present embodiment includes a maximum value of a correction amount by the second driving unit 33. The maximum value of the correction amount by the second driving unit 33 corresponds to a maximum value of a movement amount of the imaging element 22.

Next, an operation of the image capturing device 10 according to the present embodiment will be described with reference to FIG. 8. The shake correction processing illustrated in FIG. 8 is executed, for example, in a case where a power switch of the image capturing device 10 is turned on.

Figure 8:
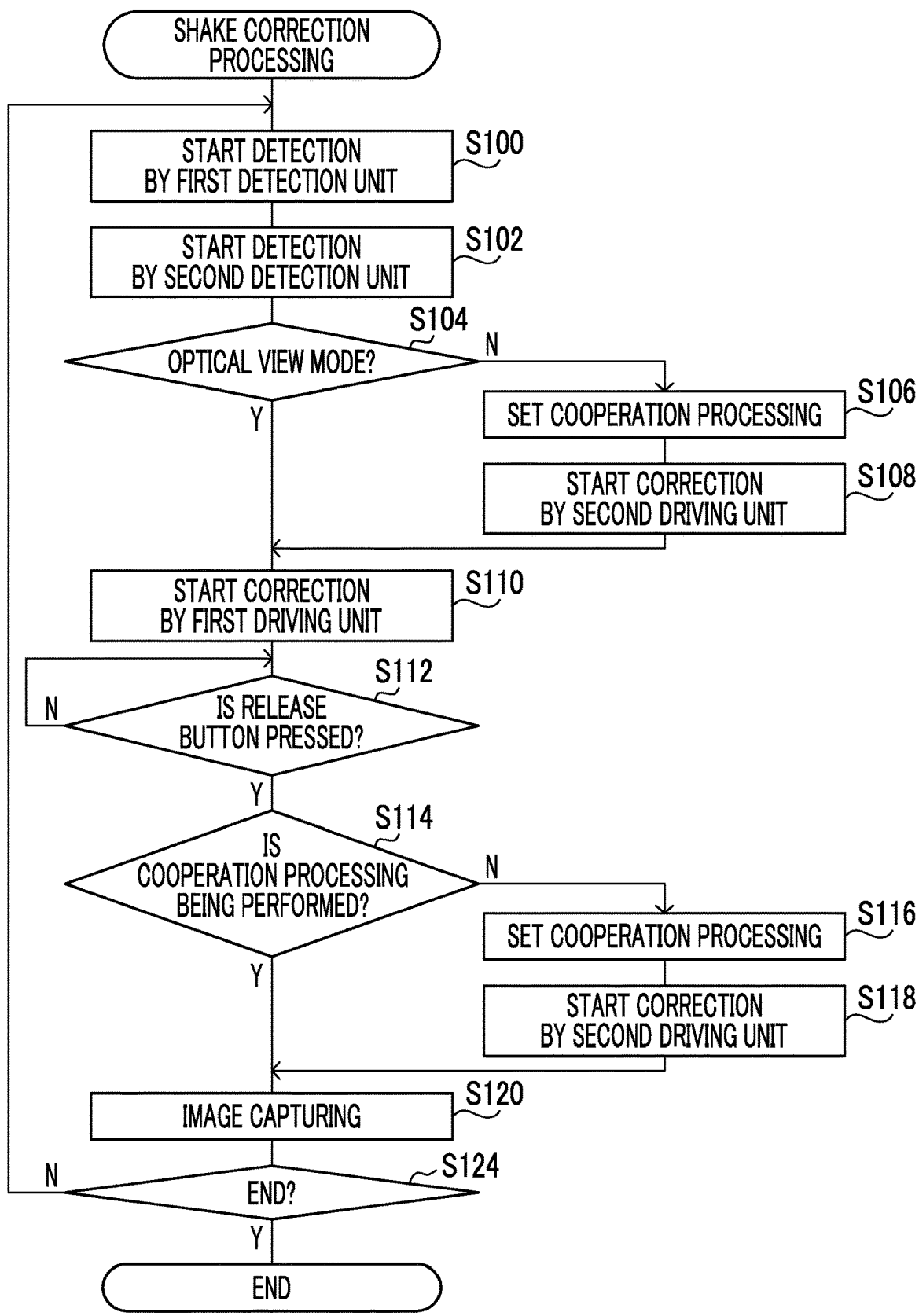
FIG. 8 is a flowchart illustrating an example of shake correction processing according to a first embodiment.

In step S100 of FIG. 8, the CPU 60 instructs the first detection unit 78 to start detection of a shake amount. Specifically, the CPU 60 outputs, to the CPU 88, a detection instruction signal indicating an instruction to start detection. In a case where the CPU 88 receives the detection instruction signal indicating an instruction to start detection from the CPU 60, the CPU 88 causes the first detection unit 78 to start detection of a shake amount. As an example, in the present embodiment, all pieces of processing sequentially performed by each of the gyro sensor 78A, the ADC 78B, the HPF 78C, and the integrator 78D included in the first detection unit 78 are performed. Therefore, a shake amount of the correction lens 73 is output from the integrator 78D of the first detection unit 78.

In next step S102, the CPU 60 instructs the second detection unit 58 to start detection of a shake amount. As an example, in the present embodiment, among pieces of processing sequentially performed by each of the gyro sensor 58A, the ADC 58B, the HPF 58C, and the integrator 58D included in the second detection unit 58, pieces of processing by the gyro sensor 58A, the ADC 58B, and the HPF 58C are performed. The present disclosure is not limited to the present embodiment, and the second detection unit 58 may perform all pieces of processing including processing by the integrator 58D.

In next step S104, the CPU 60 determines whether or not a set mode is the optical view mode. In the image capturing device 10 according to the present embodiment, in a case where the moving image capturing mode is set as the operation mode, a live view image is displayed on the display 42 regardless of whether or not an image capturing instruction is being received. Therefore, a state where the moving image capturing mode is set is treated as a state where the live view mode is set.

In a case where a set mode is not the optical view mode, in other words, in a case where the live view mode is set, a determination result in step S104 is NO, and the processing proceeds to step S106.

In step S106, the CPU 60 sets cooperation processing. Specifically, the CPU 60 calculates a share ratio in the image shake correction by the first driving unit 80 and the second driving unit 33, and sets the calculated share ratio. As an example, in the present embodiment, the share ratio in the image shake correction by the first driving unit 80 and the second driving unit 33 is set to (1−a):a. Therefore, the CPU 60 calculates a indicating the share ratio by the following Equation (1). In the following Equation (1), M1 represents a maximum value of a correction amount of image shake by the first driving unit 80, and M2 represents a maximum value of a correction amount of image shake by the second driving unit 33. In other words, the share ratio in the image shake correction by the first driving unit 80 and the second driving unit 33 corresponds to a ratio between the maximum value of the correction amount of the image shake by the first driving unit 80 and the maximum value of the correction amount of the image shake by the second driving unit 33.

$$a = M2 \div (M1 + M2) \tag{1}$$

In next step S108, the CPU 60 starts image shake correction by the second driving unit 33, and then proceeds to step S110. Specifically, the CPU 60 causes the integrator 58D of the second detection unit 58 to integrate the digital signal which is input from the HPF 58C, and thus the integrator 58D outputs a shake amount of the image capturing device main body 12. Further, the CPU 60 acquires a shake amount detected by the second detection unit 58. The CPU 60 calculates a correction amount for cancelling the detected shake amount. Specifically, the CPU 60 calculates a correction amount for cancelling a shake amount obtained by multiplying the shake amount detected by the second detection unit 58 by a which is set in step S106. In the present embodiment, the calculated correction amount corresponds to the movement amount of the imaging element 22.

On the other hand, in a case where a set mode is the optical view mode, a determination result in step S104 is YES, and the processing proceeds to step S110. In step S110, the CPU 60 instructs the first driving unit 80 to start image shake correction. Specifically, the CPU 60 outputs, to the CPU 88, a correction instruction signal indicating an instruction to start correction. In a case where a correction instruction signal indicating an instruction to start correction is input from the CPU 60, the CPU 88 acquires the shake amount detected by the first detection unit 78. The CPU 88 calculates a correction amount for cancelling the detected shake amount. In the present embodiment, the calculated correction amount corresponds to the movement amount of the correction lens 73.

In a case where the determination result in step S104 is YES and then the processing proceeds to step S110, image shake correction is performed only by the first driving unit 80. Therefore, the first driving unit 80 corrects all the shake amount detected by the first detection unit 78. The CPU 88 performs image shake correction by moving the correction lens 73 according to the calculated correction amount by the first driving unit 80.

On the other hand, in a case where the processing proceeds to step S110 after step S108, correction of the shake amount detected by the first detection unit 78 is performed by the first driving unit 80 according to the share ratio based on the setting of the cooperation processing set in step S106. Specifically, the CPU 88 calculates a correction amount for cancelling a shake amount obtained by multiplying the shake amount detected by the first detection unit 78 by (1-a) which is set in step S106. The CPU 88 performs image shake correction by moving the correction lens 73 according to the calculated correction amount by the first driving unit 80.

In next step S112, CPU 60 determines whether or not the release button included in the reception device 46 is pressed. As an example, in the present embodiment, a period from a time when the release button is pressed to a time when the image signal obtained by capturing by the imaging element 22 is stored in the image memory 36 is referred to as an image-capturing-instruction receiving period, and a period other than the image-capturing-instruction receiving period is referred to as an image-capturing-instruction non-receiving period. Thus, that is, in this step, the CPU 60 determines whether or not an image capturing instruction is received.

Until the release button is pressed, a determination result in step S112 is No. In a case where the release button is pressed, a determination result in step S112 is Yes, and the processing proceeds to step S114.

In step S114, the CPU 60 determines whether or not the cooperation processing is being performed. As described above, in the present embodiment, in the optical view mode, the cooperation processing is not performed. In a case where the cooperation processing is not performed, a determination result in step S114 is No, and the processing proceeds to step S116.

In step S116, the CPU 60 sets the cooperation processing as in step S106. In next step S118, as in step S108, the CPU 60 starts image shake correction by the second driving unit 33. Then, the CPU 60 proceeds to step S120.

On the other hand, as described above, in the present embodiment, in the live view mode, cooperation processing is performed. In a case where the cooperation processing is performed, a determination result in step S114 is Yes, and the processing proceeds to step S120.

In step S120, the CPU 60 performs image capturing by the imaging element 22 as described above. In the present embodiment, before the image capturing by the imaging element 22, the CPU 60 causes the first detection unit 78 to end shake amount detection, and causes the first driving unit 80 to end image shake correction. Specifically, the CPU 60 outputs, to the CPU 88, a detection instruction signal indicating a detection end instruction and a correction instruction signal indicating a correction end instruction. In a case where the CPU 88 receives, from the CPU 60, the detection instruction signal indicating a detection end instruction and the correction instruction signal indicating a correction end instruction, the CPU 88 causes the first detection unit 78 to end shake amount detection, and causes the first driving unit 80 to end image shake correction. Further, the CPU 60 causes the second detection unit 58 to end shake amount detection, and causes the second driving unit 33 to end image shake correction.

In next step S124, the CPU 60 determines whether or not main shake correction processing is to be ended.

In the present embodiment, as an example, an end condition is that the power switch of the image capturing device 10 is turned off, and the CPU 60 determines whether or not the end condition is satisfied. Until the end condition is satisfied, a determination result in step S124 is No. Thus, the processing returns to step S100, and the main shake correction processing is repeated. On the other hand, in a case where the end condition is satisfied, a determination result in step S124 is Yes, and then the main shake correction processing is ended.

As described above, in the image capturing device 10 according to the present embodiment, in the optical view mode, each of the first detection unit 78 and the second detection unit 58 detects a shake amount except for a case where an image capturing instruction is being received, and image shake correction is performed only by the first driving unit 80. Further, while an image capturing instruction is being received, each of the first detection unit 78 and the second detection unit 58 detects a shake amount, and the first driving unit 80 and the second driving unit 33 perform image shake correction by cooperation processing. On the other hand, in the live view mode, regardless of whether an image capturing instruction is being received or not being received, each of the first detection unit 78 and the second detection unit 58 detects a shake amount, and the first driving unit 80 and the second driving unit 33 perform image shake correction by cooperation processing.

In the image capturing device 10 according to the present embodiment, in the optical view mode, except for a case where an image capturing instruction is being received, the second driving unit 33 does not perform correction, while the second detection unit 58 detects a shake amount. Thus, in the image capturing device 10 according to the present embodiment, in a case where an image capturing instruction is being received and cooperation processing is performed, correction can be quickly and accurately performed by the second driving unit 33.

Second Embodiment

Hereinafter, a second embodiment will be described in detail. In the present embodiment, the same components and operations as those described in the first embodiment will be denoted by the same reference numerals, and a detailed description thereof will be omitted.

A configuration of the image capturing device 10 according to the present embodiment is the same as the configuration of the image capturing device 10 according to the first embodiment (refer to FIGS. 1 to 7), and a description thereof will be omitted.

On the other hand, an operation of the image capturing device 10 according to the present embodiment is different in a part of the shake correction processing. In the optical view mode, correction is performed by moving the correction lens 73 only by the first driving unit 80 except for a case where an image capturing instruction is being received. At a time when an image capturing instruction is received (in the first embodiment, a time when the release button is pressed), the correction lens 73 is moved by the first driving unit 80, and thus the correction lens 73 is disposed at a position deviating from the center point of the movable range. Therefore, in a case where the correction lens 73 is moved, the correction lens 73 is likely to reach the movable range.

In other words, a movable distance of the correction lens 73 becomes shorter than that in a state where the correction lens 73 is disposed at the center point of the movable range. On the other hand, except for a case where an image capturing instruction is being received, correction by the second driving unit 33 is not performed, and the imaging element 22 is not moved. Thus, at the time when an image capturing instruction is received, the imaging element 22 is disposed at the center point of the movable range.

Therefore, in movement of the imaging element 22, unlike the case where the correction lens 73 is moved, the imaging element 22 is unlikely to reach the movable range.

In the image capturing device 10 according to the present embodiment, in the optical view mode, in a case where an image capturing instruction is being received and cooperation processing is performed, the share ratio by the second driving unit 33 is set to be larger. Specifically, in a case where the share ratio in the optical view mode is a1 and the share ratio in the live view mode is a2, the share ratio a1 is set to be larger than the share ratio a2 (a2<a1).

As an example, in the present embodiment, the share ratio a2 corresponds to the share ratio a according to the first embodiment. Further, as an example, the share ratio a1 is set to a value larger than the share ratio a2 by 10% (a1=a2×1.1). The value of the share ratio a1 may be predetermined in consideration of the movable ranges of the correction lens 73 and the imaging element 22, and is not limited to the present embodiment.

Figure 9:
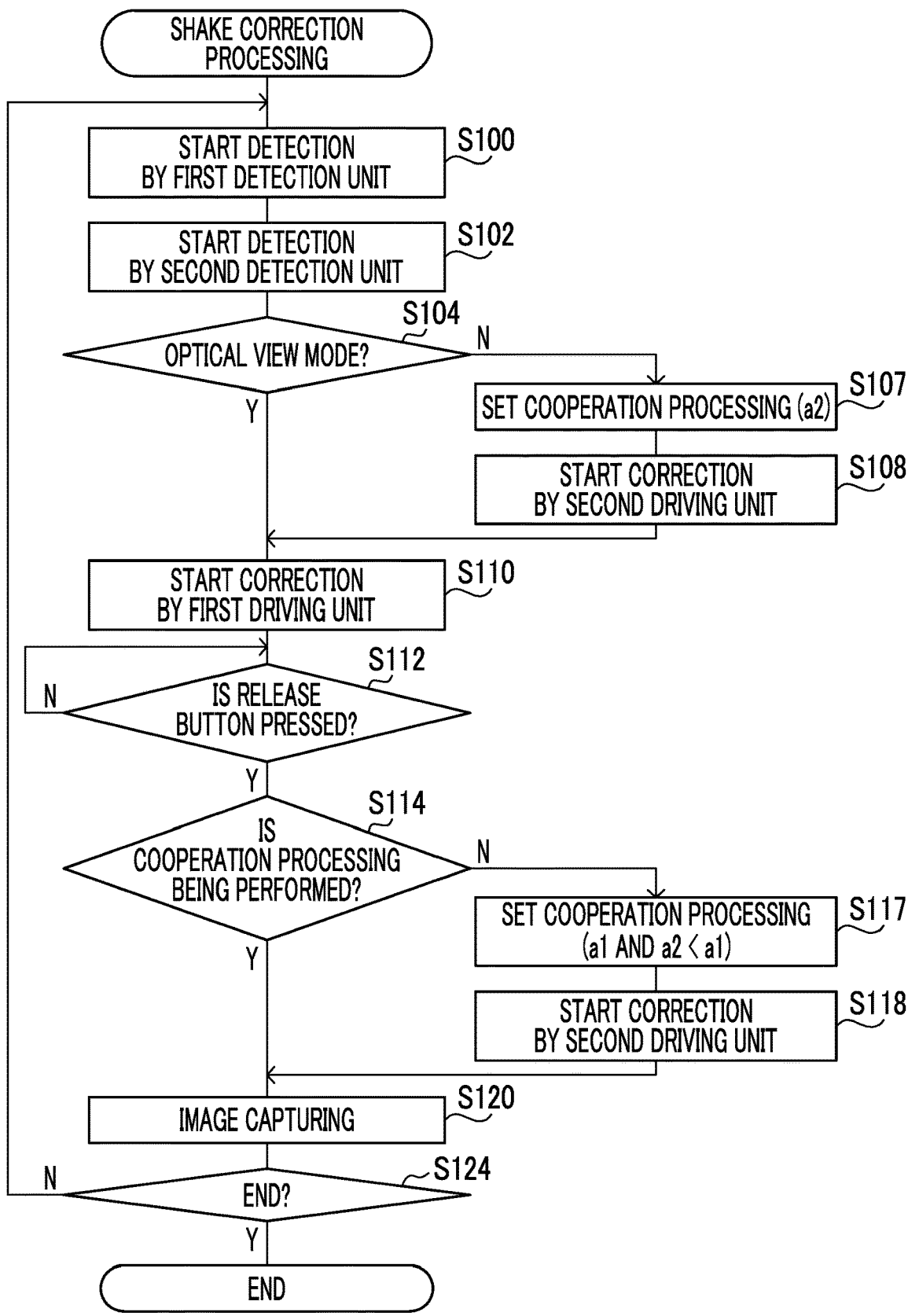
FIG. 9 is a flowchart illustrating an example of shake correction processing according to a second embodiment.

FIG. 9 illustrates a flowchart illustrating an example of the shake correction processing according to the present embodiment. The shake correction processing according to the present embodiment illustrated in FIG. 9 is different from the shake correction processing (refer to FIG. 8) according to the first embodiment in that processing of step S107 is performed instead of step S106 and processing of step S117 is performed instead of step S116.

As illustrated in FIG. 9, in step S107, the CPU 60 sets cooperation processing in the live view mode. A method of setting the cooperation processing is the same as step S106 of the shake correction processing (refer to FIG. 8) according to the first embodiment. On the other hand, as described above, in the present embodiment, the share ratio is different from the share ratio in the first embodiment. Specifically, in the present embodiment, the share ratio in the image shake correction by the first driving unit 80 and the second driving unit 33 is set to (1−a2):a2. The CPU 60 calculates a share ratio a2 by the following Equation (2). In the following Equation (2), M1 and M2 are the same as M1 and M2 in Equation (1).

$$a2 = M2 \div (M1 + M2) \quad (2)$$

Further, as illustrated in FIG. 9, in step S117, the CPU 60 sets cooperation processing in the optical view mode. A method of setting the cooperation processing is the same as step S116 of the shake correction processing (refer to FIG. 8) according to the first embodiment. On the other hand, as described above, in the present embodiment, the share ratio is different from the share ratio in the first embodiment. Specifically, in the present embodiment, the share ratio in the image shake correction by the first driving unit 80 and the second driving unit 33 is set to (1−a1):a1. The CPU 60 calculates a share ratio a1 by the following Equation (3).

$$a1 = a2 \times 1.1 \quad (3)$$

As described above, in the image capturing device 10 according to the present embodiment, in the share ratio of the second driving unit 33 in the cooperation processing, the share ratio a1 in the optical view mode is set to be larger than the share ratio a2 in the live view mode. By setting the share ratio a1 of the correction by the second driving unit 33 in a case where the cooperation processing is performed in the optical view mode to be larger, in the cooperation processing, in a case where the correction lens 73 is moved by the first driving unit 80 for correction, the correction lens 73 is unlikely to reach the movable range. Therefore, according to the image capturing device 10 of the present embodiment, the limitation of the correction by the first driving unit 80 is suppressed, and thus the correction can be performed with high accuracy.

Third Embodiment

Hereinafter, a third embodiment will be described in detail. In the present embodiment, the same components and operations as those described in the first embodiment will be denoted by the same reference numerals, and a detailed description thereof will be omitted.

A configuration of the image capturing device 10 according to the present embodiment is the same as the configuration of the image capturing device 10 according to the first embodiment (refer to FIGS. 1 to 7), and a description thereof will be omitted.

On the other hand, an operation of the image capturing device 10 according to the present embodiment is different in a part of the shake correction processing.

In the optical view mode, except for a case where an image capturing instruction is being received as described above, the correction by the second driving unit 33 is not performed, and the imaging element 22 is not moved. In a case where an image capturing instruction is received, in order to perform cooperation processing, the second driving unit 33 starts movement of the imaging element 22 according to the correction amount. Here, in a case where the movement of the imaging element 22 is suddenly started, a problem such as a situation in which the second driving unit 33 does not smoothly move may occur. For this reason, in the present embodiment, except for a case where an image capturing instruction is being received in the optical view mode, the second driving unit 33 moves the imaging element 22 in advance. Thus, in a case where cooperation processing is started, the second driving unit 33 is smoothly moved. Except for a case where an image capturing instruction is being received in the optical view mode, the first mirror 24 is disposed at the light-receiving-surface covering position α as described above. Thus, even in a case where the imaging element 22 is moved, image shake of the optical image observed by the finder 54 is not corrected.

Except for a case where an image capturing instruction is being received in the optical view mode, an amount of movement (movement amount) of the imaging element 22 is set to an extent that does not affect correction performance of the second driving unit 33. For example, in a case where the movement amount of the imaging element 22 is set to be too large, similar to the problem of the movable range of the correction lens 73 described in the second embodiment, there is a problem that the imaging element 22 is likely to reach the movable range in a case where the cooperation processing is started, and there is a concern that the correction performance is deteriorated. For this reason, in a case where the extent of the movable range of the imaging element 22 is set to 1, when the movement amount for moving the imaging element 22 in advance is less than 0.1 (10%) of the movable range, the correction performance is unlikely to be affected.

Figure 10:
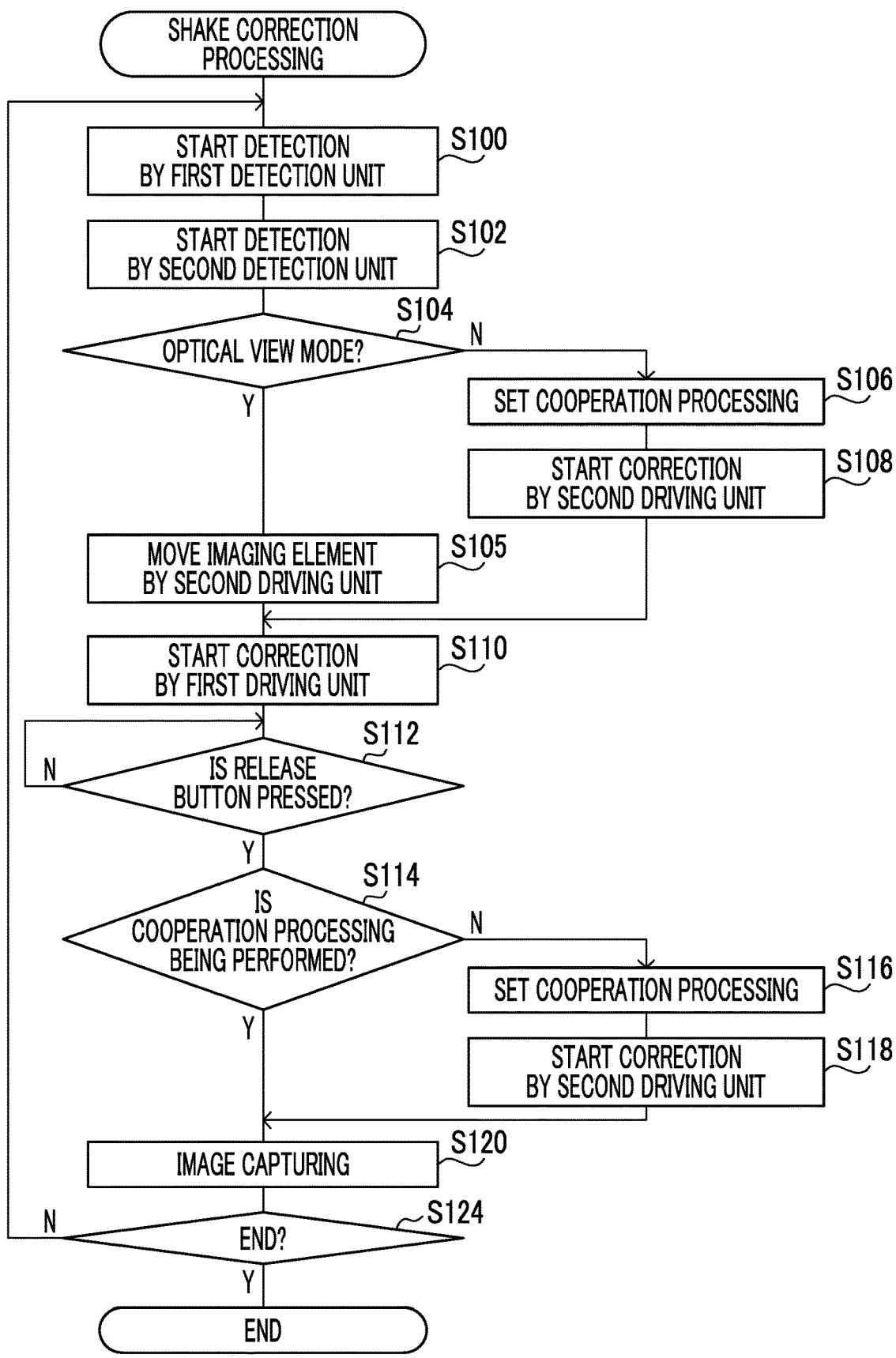
FIG. 10 is a flowchart illustrating an example of shake correction processing according to a third embodiment.

FIG. 10 illustrates a flowchart illustrating an example of the shake correction processing according to the present embodiment. The shake correction processing according to the present embodiment illustrated in FIG. 10 is different from the shake correction processing (refer to FIG. 8) according to the first embodiment in that the processing proceeds to step S105 before step S110 in a case where the determination result in step S104 is Yes.

As illustrated in FIG. 10, in step S106, the CPU 60 sets cooperation processing in the live view mode. The imaging element 22 is moved by the second driving unit 33. As described above, the CPU 60 according to the present embodiment sets a value obtained by multiplying the extent of the movable range of the imaging element 22 by 0.1, as the movement amount, and causes the second driving unit 33 to move the imaging element 22 by the movement amount.

As described above, in the image capturing device 10 according to the present embodiment, except for a case where an image capturing instruction is being received in the optical view mode, the movement of the imaging element 22 by the second driving unit 33 is performed in advance. By performing the movement of the imaging element 22 in advance, in a case where an image capturing instruction is received and the cooperation processing is started, the second driving unit 33 can quickly move the imaging element 22. Therefore, according to the image capturing device 10 of the present embodiment, the correction can be performed with high accuracy. Further, according to the image capturing device 10 of the present embodiment, it is possible to shorten a correction time for correcting the shake by moving the imaging element 22.

As described above, the image capturing device 10 according to each embodiment includes the imaging lens 14 and the image capturing device main body 12 including the imaging element 22 that captures the optical image transmitting through the imaging lens 14.

Further, the image capturing device 10 includes the first detection unit 78 that detects a shake amount of the imaging lens 14, the second detection unit 58 that detects a shake amount of the image capturing device main body 12, the first driving unit 80 that performs image shake correction by the correction lens 73 based on a detection result of the first detection unit 78, and the second driving unit 33 that performs image shake correction by the image capturing device main body 12 based on a detection result of the second detection unit 58. Further, the image capturing device 10 includes the finder 54 that is used to observe the optical image transmitting through the imaging lens 14, and a reception device 46 that receives an instruction to capture the optical image. Further, the image capturing device 10 includes the CPU 60 and the CPU 88 that perform a control of causing each of the first detection unit 78 and the second detection unit 58 to detect a shake amount and causing only the first driving unit 80 to perform image shake correction in the optical view mode in which the optical image is observed by the finder 54 except for a case where an image capturing instruction is being received.

As described above, in the image capturing device 10 according to the present embodiment, in the optical view mode, only the first driving unit 80 performs image shake correction, and thus a correction amount of the image shake correction can be larger than the correction amount in a case where cooperation processing is performed.

Further, in general, the HPF 58C may have a transient response, and as a result, it takes time from start of processing by the HPF 58C until an influence of zero-point drift of the gyro sensor 58A becomes negligible. For this reason, immediately after the HPF 58C starts processing, accuracy in shake amount detection may decrease due to the influence of zero-point drift.

On the other hand, in the image capturing device 10 according to each embodiment, the second detection unit 58 detects a shake amount except for a case where an image capturing instruction is being received in the optical view mode. As a specific example, in each embodiment, the second detection unit 58 performs processing by each of the gyro sensor 58A, the ADC 58B, and the HPF 58C of the second detection unit 58. Thus, in the image capturing device 10 according to each embodiment, in a case where an image capturing instruction is received and cooperation processing is started, the influence of the zero-point drift can be suppressed.

Therefore, according to the image capturing device 10 of each embodiment, it is possible to accurately correct the shake.

In each embodiment, in a case where the cooperation processing is performed, a form in which each of the first driving unit 80 and the second driving unit 33 corrects the shake amount according to the predetermined share ratio has been described. On the other hand, a method of sharing the correction is not limited to the form described above. For example, as in the example illustrated in FIG. 11, a form in which the first driving unit 80 and the second driving unit 33 share the correction for each frequency of the shake amount of the image shake may be adopted. For example, a low-frequency shake included in the detected shake tends to be a slow and large shake, and a high-frequency shake included in the detected shake tends to be a fast and small shake. In this case, a correction amount of the low-frequency shake is larger than a correction amount of the high-frequency shake. As described above, in a state where the cooperation processing is started, the correction lens 73 is moved and thus is likely to reach the movable range. On the other hand, the imaging element 22 is not moved or a movement amount is small even in a case where the imaging element 22 is moved, and as a result, the imaging element 22 is unlikely to reach the movable range. In such a case, it is preferable to adopt a form in which the second driving unit 33 corrects the high-frequency shake with a large correction amount and the first driving unit 80 corrects the low-frequency shake.

Further, for example, a form in which any one of the first driving unit 80 and the second driving unit 33 performs low-frequency (high-frequency) correction according to cutoff frequencies of the HPF 78C of the first detection unit 78 and the HPF 58C of the second detection unit 58 may be adopted. The cutoff frequencies of the HPF 78C and the HPF 58C are respectively in correlation with the zero-point drifts of the gyro sensor 78A and the gyro sensor 58A. In many cases, as the zero-point drift is larger, the cutoff frequency is higher. For this reason, in a case where performances of the gyro sensor 78A and the gyro sensor 58A are different from each other, the cutoff frequencies of the HPF 78C and the HPF 58C are different from each other. In this case, it is preferable to adopt a form in which low-frequency shake is corrected by performing correction based on a detection result of the detection unit including the HPF having a lower cutoff frequency among the first detection unit 78 and the second detection unit 58, that is, the detection unit capable of detecting the lower-frequency shake amount.

For example, as in the example illustrated in FIG. 11, for the detected shake amount, in a case where the first driving unit 80 (OIS) performs correction of shake having a high frequency equal to or higher than a predetermined frequency and the second driving unit 33 (BIS) performs correction of shake having a low frequency lower than the predetermined frequency, the second detection unit 58 and the first detection unit 78 may have the following configurations. In the second detection unit 58, an HPF that cuts off low frequency components having a frequency lower than a predetermined frequency may be provided between the HPF 58C and the integrator 58D. Further, in the first detection unit 78, a low pass filter (LPF) that cuts off high frequency components having a frequency equal to or higher than a predetermined frequency may be provided between the HPF 78C and the integrator 78D. The predetermined frequency may be determined according to the movable range of each of the correction lens 73 and the imaging element 22, the zero-point drift of each of the gyro sensor 78A and the gyro sensor 58A, and the like, as described above.

In each embodiment, a form in which the reception device 46 is an example of a reception unit that receives any one mode of the optical view mode and the live view mode has been described. On the other hand, the reception unit is not limited to the form described above. For example, as an example of the reception unit, an eyepiece sensor that is provided near the finder 54 to detect approach of the user's eye may be used. In this case, the optical view mode may be set during a period for which the eyepiece sensor detects that the user's eye is approaching the finder 54, and the live view mode may be set during a period other than the period, that is, a period for which the user's eye is not approaching the finder 54.

Further, in the embodiment, a case where two control units (in the embodiment, the main-body-Side main control unit 28 and the lens-side main control unit 76) perform a control for correcting image shake in cooperation with each other has been described. On the other hand, the present disclosure is not limited thereto. For example, a form in which one control unit performs a control for correcting image shake may be adopted. In this case, a form in which the main-body-side main control unit 28 directly controls the first driving unit 80 may be adopted as an example.

Further, in the embodiment, a case where the CPU 60 executes the shake correction processing illustrated in each of FIGS. 8 to 10 and the CPU 88 performs a control for correcting the image shake according to an instruction from the CPU 60 has been described. On the other hand, the present disclosure is not limited thereto. For example, the CPU 88 may execute the shake correction processing illustrated in each of FIGS. 8 to 10, and the CPU 60 may perform a control for correcting the image shake according to an instruction from the CPU 88.

Further, in the embodiment, a case where the main-body-side main control unit 28 that controls the entire image capturing device 10 performs a control for correcting the image shake has been described. On the other hand, the present disclosure is not limited thereto. For example, a form in which a dedicated control unit for shake correction is provided in the image capturing device main body 12 separately from the main-body-side main control unit 28 and a CPU of the dedicated control unit for shake correction executes the shake correction processing illustrated in each of FIGS. 8 to 10 may be adopted.

Further, in the embodiment, a case where a ratio of a maximum value of a correction amount of the image shake by the first driving unit 80 and a maximum value of a correction amount of the image shake by the second driving unit 33 is applied as the share ratio in the case where the image shake correction is performed by being shared by the first driving unit 80 and the second driving unit 33 has been described. On the other hand, the present disclosure is not limited thereto. For example, a form in which a predetermined ratio (for example, 1:1) as a fixed value is applied as the share ratio may be adopted.

Further, in the embodiment, a case where the shake amount detected by the first detection unit 78 is used for the image shake correction by the first driving unit 80 and the shake amount detected by the second detection unit 58 is used for the image shake correction by the second driving unit 33 has been described. On the other hand, the present disclosure is not limited thereto. For example, a form in which the shake amount detected by the first detection unit 78 or the second detection unit 58 is used for the shake correction by any one of the first driving unit 80 and the second driving unit 33 may be adopted. In this case, a form in which the shake amount detected by the detection unit having a higher performance in shake amount detection among the first detection unit 78 and the second detection unit 58 is used for the shake correction is adopted.

Further, in the embodiment, for example, as a hardware structure of a processing unit that executes various processing such as the first control unit and the second control unit, the following various processors are may be used. The various processors include, as described above, a CPU which is a general-purpose processor that functions as various processing units by executing software (program), and a dedicated electric circuit which is a processor having a circuit configuration specifically designed to execute specific processing, such as a programmable logic device (PLD) or an application specific integrated circuit (ASIC) that is a processor of which the circuit configuration may be changed after manufacturing such as a field programmable gate array (FPGA).

One processing unit may be configured by one of these various processors, or may be configured by a combination of two or more processors of the same type or different types (for example, a combination of a plurality of FPGAs or a combination of a CPU and an FPGA). Further, the plurality of processing units may be configured by one processor.

As an example in which the plurality of processing units are configured by one processor, firstly, as represented by a computer such as a client and a server, a form in which one processor is configured by a combination of one or more CPUs and software and the processor functions as the plurality of processing units may be adopted. Secondly, as represented by a system on chip (SoC) or the like, a form in which a processor that realizes the function of the entire system including the plurality of processing units by one integrated circuit (IC) chip is used may be adopted. As described above, the various processing units are configured by using one or more various processors as a hardware structure.

Further, as the hardware structure of the various processors, more specifically, an electric circuit (circuitry) in which circuit elements such as semiconductor elements are combined may be used.

Further, in the embodiment, an example in which the main-body-side shake correction program 98 is stored (installed) in the secondary storage unit 64 in advance has been described. On the other hand, the present disclosure is not limited thereto. The main-body-side shake correction program 98 may be provided by being recorded in a recording medium such as a compact disc read only memory (CD-ROM), a digital versatile disc read only memory (DVD-ROM), or a Universal Serial Bus (USB) memory. Further, the main-body-side shake correction program 98 may be downloaded from an external device via a network.

Further, in the embodiment, an example in which the lens-side shake correction program 96 is stored (installed) in the secondary storage unit 92 in advance has been described. On the other hand, the present disclosure is not limited thereto. The lens-side shake correction program 96 may be provided by being recorded in a recording medium such as a CD-ROM, a DVD-ROM, or a USB memory. Further, the lens-side shake correction program 96 may be downloaded from an external device via a network.

EXPLANATION OF REFERENCES

10: image capturing device
12: image capturing device main body
13, 15: mount
14: imaging lens
18: lens unit
19: diaphragm
20: control device
22: imaging element
22A: light receiving surface
24: first mirror
26: second mirror
28: main-body-side main control unit
30: mirror driving unit
32: imaging element driver
33: second driving unit
34: image signal processing circuit
35: imaging element position sensor
36: image memory
38: image processing unit
40: display control unit
42: display
44: reception I/F
46: reception device
48: medium I/F
50: memory card
52, 86: external I/F
54: finder
56, 94: bus line
58: second detection unit
58A, 78A: gyro sensor
58B, 78B: ADC
58C, 78C: HPF
58D, 78D: integrator
60, 88: CPU
62, 90: primary storage unit
64, 92: secondary storage unit
70: light-incident lens
72: zoom lens
73: correction lens
74: focus lens
76: lens-side main control unit
78: first detection unit
80: first driving unit
82: lens position sensor
96: lens-side shake correction program
97: lens-side shake correction information
98: main-body-side shake correction program
99: main-body-side shake correction information
L1: optical axis
α: light-receiving-surface covering position
β: light-receiving-surface open position

What is claimed is:

1. An image capturing device comprising:
an imaging lens;
an image capturing device main body including an imaging element that captures an optical image transmitting through the imaging lens;
a first detection device that detects a shake amount of the imaging lens;
a second detection device that detects a shake amount of the image capturing device main body;
a first correction device that performs image shake correction by a correction lens based on a detection result of the first detection device;
a second correction device that performs image shake correction by the image capturing device main body based on a detection result of the second detection device;
an observation unit that is used for observing the optical image transmitting through the imaging lens;
a reception device that receives an image capturing instruction of the optical image; and
a processor configured to
control the first detection device and the second detection device to detect the shake amount and only the first correction device to perform image shake correction except for a case where the image capturing instruction is being received in an observation mode in which the optical image is observed by the observation unit;
control the first detection device and the second detection device to detect the shake amount and the first correction device and the second correction device to perform image shake correction in a case where the image capturing instruction is being received in the observation mode.

2. An image capturing device according to claim 1, wherein
the processor is further configured to control the first detection device and the second detection device to detect the shake amount before the image capturing instruction is being received.

3. The image capturing device according to claim 1, further comprising:
a display unit that displays a captured image according to an image signal obtained by capturing by the imaging element,
wherein the processor is further configured to control the first detection device and the second detection device to detect the shake amount and the first correction device and the second correction device to perform image shake correction regardless of whether or not the image capturing instruction is being received in a display mode in which the captured image is displayed by the display unit.

4. The image capturing device according to claim 1, wherein the processor is further configured to control the first correction device and the second correction device to share the shake amount and perform image shake correction, in a case where image shake correction is performed by the first correction device and the second correction device.

5. The image capturing device according to claim 3, wherein a correction amount of the image shake correction by the second correction device in the observation mode is larger than a correction amount of the image shake correction by the second correction device in the display mode.

6. The image capturing device according to claim 1, wherein the processor is further configured to control the second correction device to correct low frequency components of the image shake having a frequency lower than a predetermined frequency and the first correction device to correct high frequency components of the image shake having a frequency equal to or higher than the predetermined frequency in a case where image shake correction is performed by the first correction device and the second correction device.

7. The image capturing device according to claim 1, wherein the second detection device performs a plurality of pieces of processing for detecting the shake amount of the image capturing device main body, and the processor is further configured to control the second detection device to perform a part of the plurality of pieces of processing except for a case where the image capturing instruction is being received in the observation mode and control the second detection device to perform the rest of the plurality of pieces of processing in a case where the image capturing instruction is received in the observation mode.

8. The image capturing device according to claim 7, wherein the second detection device includes a sensor that outputs a signal indicating a detection result obtained by detecting an angular velocity, the part of the plurality of pieces of processing is processing of removing an external factor included in the signal, and the rest of the plurality of pieces of processing is processing of calculating the shake amount based on the signal from which the external factor is removed.

9. The image capturing device according to claim 1, wherein the first correction device performs image shake correction by moving the correction lens, the second correction device performs image shake correction by moving the imaging element, and the processor is further configured to control the imaging element to move according to a first correction amount except for a case where the image capturing instruction is being received in the observation mode and a second correction amount in a case where the image capturing instruction is being received in the observation mode, wherein the first correction amount is smaller than the second correction amount.

10. The image capturing device according to claim 1, wherein the processor is further configured to calculate a correction amount with which the first correction device performs correction based on the detection result of the first detection device, and calculate a correction amount with which the second correction device performs correction based on the detection result of the second detection device.

11. The image capturing device according to claim 2, wherein the processor is further configured to calculate a correction amount with which the first correction device performs correction based on the detection result of the first detection device, and calculate a correction amount with which the second correction device performs correction based on the detection result of the second detection device.

12. The image capturing device according to claim 3, wherein the processor is further configured to calculate a correction amount with which the first correction device performs correction based on the detection result of the first detection device, and calculate a correction amount with which the second correction device performs correction based on the detection result of the second detection device.

13. The image capturing device according to claim 4, wherein the processor is further configured to calculate a correction amount with which the first correction device performs correction based on the detection result of the first detection device, and calculate a correction amount with which the second correction device performs correction based on the detection result of the second detection device.

14. The image capturing device according to claim 5, wherein the processor is further configured to calculate a correction amount with which the first correction device performs correction based on the detection result of the first detection device, and calculate a correction amount with which the second correction device performs correction based on the detection result of the second detection device.

15. The image capturing device according to claim 6, wherein the processor is further configured to calculate a correction amount with which the first correction device performs correction based on the detection result of the first detection device, and calculate a correction amount with which the second correction device performs correction based on the detection result of the second detection device.

16. The image capturing device according to claim 1, wherein the processor includes a first processor that controls the first detection device according to a detection instruction signal and controls the first correction device according to a correction instruction signal; and a second processor that outputs the detection instruction signal and the correction instruction signal to the first control device and controls the second detection device and the second correction device.

17. The image capturing device according to claim 16, wherein the first processor is further configured to calculate a correction amount with which the first correction device performs correction based on the detection result of the first detection device, and the second processor is further configured to calculate a correction amount with which the second correction device performs correction based on the detection result of the second detection device.

18. The image capturing device according to claim 16, wherein the first processor, the imaging lens, the first detection device, and the first correction device are included in a lens unit, and the second processor, the imaging element, the second detection device, and the second correction device are included in the image capturing device main body.

19. An image capturing method performed by an image capturing device including an imaging lens, an image capturing device main body including an imaging element that captures an optical image transmitting through the imaging lens, a first detection unit that detects a shake amount of the imaging lens, a second detection unit that detects a shake amount of the image capturing device main body, a first correction unit that performs image shake correction by a correction lens based on a detection result of the first detection unit, a second correction unit that performs image shake correction by the image capturing device main body based on a detection result of the second detection unit, an observation unit that is used for observing the optical image transmitting through the imaging lens, and a reception unit that receives an image capturing instruction of the optical image, the method comprising:

controlling the first detection unit and the second detection unit to detect the shake amount and causing only the first correction unit to perform image shake correction except for a case where the image capturing instruction is being received in an observation mode in which the optical image is observed by the observation unit; and controlling the first detection device and the second detection device to detect the shake amount and the first correction device and the second correction device to perform image shake correction in a case where the image capturing instruction is being received in the observation mode.

20. A non-transitory computer readable medium for storing a program for causing a computer controlling an image capturing device to execute a process, the image capturing device including an imaging lens, an image capturing device main body including an imaging element that captures an optical image transmitting through the imaging lens, a first detection unit that detects a shake amount of the imaging lens, a second detection unit that detects a shake amount of the image capturing device main body, a first correction unit that performs image shake correction by a correction lens based on a detection result of the first detection unit, a second correction unit that performs image shake correction by the image capturing device main body based on a detection result of the second detection unit, an observation unit that is used for observing the optical image transmitting through the imaging lens, and a reception unit that receives an image capturing instruction of the optical image, the process comprising:

controlling the first detection unit and the second detection unit to detect the shake amount and only the first correction unit to perform image shake correction except for a case where the image capturing instruction is being received in an observation mode in which the optical image is observed by the observation unit; and controlling the first detection device and the second detection device to detect the shake amount and the first correction device and the second correction device to perform image shake correction in a case where the image capturing instruction is being received in the observation mode.

* * * * *